United States Patent
Achten et al.

(10) Patent No.: US 11,440,242 B2
(45) Date of Patent: Sep. 13, 2022

(54) FUSED DEPOSITION MODELING-BASED ADDITIVE MANUFACTURING PROCESS AT LOW TEMPERATURES

(71) Applicant: Covestro Deutschland AG, Leverkusen (DE)

(72) Inventors: Dirk Achten, Leverkusen (DE); Thomas Büsgen, Leverkusen (DE); Dirk Dijkstra, Odenthal (DE); Nicolas Degiorgio, Krefeld (DE); Roland Wagner, Leverkusen (DE); Levent Akbas, Witten (DE); Peter Reichert, Dormagen (DE); Jörg Büchner, Bergisch Gladbach (DE)

(73) Assignee: Covestro Deutschland AG, Leverkusen (DE)

( * ) Notice: Subject to any disclaimer, the term of this patent is extended or adjusted under 35 U.S.C. 154(b) by 194 days.

(21) Appl. No.: 16/331,198

(22) PCT Filed: Sep. 11, 2017

(86) PCT No.: PCT/EP2017/072731
§ 371 (c)(1),
(2) Date: Mar. 7, 2019

(87) PCT Pub. No.: WO2018/046726
PCT Pub. Date: Mar. 15, 2018

(65) Prior Publication Data
US 2019/0217533 A1    Jul. 18, 2019

(30) Foreign Application Priority Data

Sep. 12, 2016    (EP) .................................... 16188416

(51) Int. Cl.
| | |
|---|---|
| *B29C 64/00* | (2017.01) |
| *B29C 64/118* | (2017.01) |
| *B33Y 70/00* | (2020.01) |
| *B33Y 10/00* | (2015.01) |
| *B33Y 40/10* | (2020.01) |

(Continued)

(52) U.S. Cl.
CPC ............ *B29C 64/118* (2017.08); *B29C 64/00* (2017.08); *B29C 64/10* (2017.08); *B29C 64/176* (2017.08); *B29C 64/182* (2017.08); *B29C 64/20* (2017.08); *B29C 64/205* (2017.08); *B29C 64/227* (2017.08); *B29C 64/245* (2017.08); *B29C 64/25* (2017.08); *B29C 64/255* (2017.08); *B29C 64/30* (2017.08); *B29C 64/307* (2017.08); *B29C 64/40* (2017.08); *B33Y 10/00* (2014.12); *B33Y 30/00* (2014.12); *B33Y 40/00* (2014.12); *B33Y 40/10* (2020.01); *B33Y 40/20* (2020.01); *B33Y 50/00* (2014.12); *B33Y 70/00* (2014.12);

(Continued)

(58) Field of Classification Search
CPC .............................. B29C 64/118; B33Y 10/00
See application file for complete search history.

(56) References Cited

U.S. PATENT DOCUMENTS

| | | |
|---|---|---|
| 4,946,535 A | 8/1990 | Meckel et al. |
| 5,121,329 A | 6/1992 | Crump |

(Continued)

FOREIGN PATENT DOCUMENTS

| | | |
|---|---|---|
| EP | 0192946 A1 | 9/1986 |
| WO | WO-9853974 A1 | 12/1998 |

(Continued)

OTHER PUBLICATIONS

Korpela, J., Kokkari, A., Korhonen, H., Malin, M., Närhi, T. and Seppälä, J., 2013. Biodegradable and bioactive porous scaffold structures prepared using fused deposition modeling. Journal of Biomedical Materials Research Part B: Applied Biomaterials, 101(4), pp. 610-619. (Year: 2012).*

(Continued)

*Primary Examiner* — Nicholas R Krasnow
(74) *Attorney, Agent, or Firm* — Jed C. Benson

(57) ABSTRACT

A process for manufacturing an article comprises the steps of: I) applying a filament of an at least partially fused construction material to a support so as to obtain a layer of the construction material which corresponds to a first selected cross-section of the article; II) applying a filament of the at least partially fused construction material to a previously applied layer of the construction material so as to obtain a further layer of the construction material which corresponds to a further selected cross-section of the article and which is bonded to the previously applied layer; and III) repeating step II) until the article is formed. At least steps II) and III) are carried out in a chamber and the construction material comprises a fusible polymer. The fusible polymer has a fusion range (DSC, differential scanning calorimetry; 2nd heating at a heating rate of 5 K/min.) of ≥20° C. to ≤100° C. The fusible polymer further has a complex viscosity |η*| (determined by viscosity measurement in the melt using a plate-plate oscillating viscometer according to ISO 6721-10 at 100° C. and a shear rate of 1/s) of ≥10 Pas to ≤1000000 Pas. Finally, the temperature inside the chamber is ≤50° C. The invention also relates to an article manufactured by the process according to the invention, to an article having a substrate and to an article bonded to the substrate, the article being in the form of an adhesive joint or varnish region, and to the use of a particular polyurethane in fused deposition modeling-based additive manufacturing processes.

8 Claims, No Drawings

(51) Int. Cl.

| | |
|---|---|
| B29C 64/20 | (2017.01) |
| B29C 64/205 | (2017.01) |
| B33Y 40/20 | (2020.01) |
| B29C 64/25 | (2017.01) |
| B29C 64/10 | (2017.01) |
| B29C 64/255 | (2017.01) |
| B29C 64/176 | (2017.01) |
| B29C 64/182 | (2017.01) |
| B29C 64/245 | (2017.01) |
| B29C 64/40 | (2017.01) |
| B33Y 99/00 | (2015.01) |
| B29C 64/227 | (2017.01) |
| B33Y 30/00 | (2015.01) |
| B29C 64/307 | (2017.01) |
| B33Y 50/00 | (2015.01) |
| B33Y 40/00 | (2020.01) |
| B33Y 80/00 | (2015.01) |
| B29C 64/30 | (2017.01) |

(52) U.S. Cl.
CPC .............. *B33Y 80/00* (2014.12); *B33Y 99/00* (2014.12); *B29K 2995/007* (2013.01)

(56) References Cited

U.S. PATENT DOCUMENTS

| | | | |
|---|---|---|---|
| 7,946,840 B2 | 5/2011 | Perret et al. | |
| 2005/0245719 A1* | 11/2005 | Mather | C08G 61/08 528/60 |
| 2009/0250828 A1* | 10/2009 | Rosen | B29D 11/00038 264/1.38 |
| 2010/0104832 A1* | 4/2010 | Messe | G03F 7/038 428/201 |
| 2015/0182811 A1* | 7/2015 | Bender | A63B 37/0064 473/376 |
| 2016/0031159 A1* | 2/2016 | Church | B29C 64/106 264/308 |
| 2016/0108154 A1 | 4/2016 | Krutzer | |
| 2017/0129177 A1 | 5/2017 | Hättig et al. | |
| 2017/0259497 A1* | 9/2017 | Prestayko | C09D 7/61 |
| 2018/0187000 A1* | 7/2018 | Li | C08L 67/04 |
| 2018/0282471 A1* | 10/2018 | Green | C08G 18/722 |
| 2018/0291141 A1* | 10/2018 | Yang | C08G 18/222 |
| 2019/0184628 A1* | 6/2019 | Gorin | C08G 18/48 |
| 2020/0299530 A1* | 9/2020 | Green | C08G 18/3206 |

FOREIGN PATENT DOCUMENTS

| | | |
|---|---|---|
| WO | WO-2015109141 A1 | 7/2015 |
| WO | WO-2015197515 A1 | 12/2015 |
| WO | WO-2016108154 A1 | 7/2016 |

OTHER PUBLICATIONS

Noroozi, N., 2013. Rheology and processing of biodegradable poly (epsilon-caprolactone) polyesters and their blends with polylactides (Doctoral dissertation, University of British Columbia). https://central.bac-lac.gc.ca/.item?id=TC-BVAU-43880&op=pdf&app=Library&oclc_number=1032929842 (Year: 2013).*

Grauer, K.W., "Fused Deposition Modeling—The Most Popular 3D Printing Method", Engl 202C, 2015, pp. 1-5.

International Search Report for PCT/EP2017/072731 dated Nov. 10, 2017.

Written Opinion of the International Searching Authority for PCT/EP2017/072731 dated Nov. 10, 2017.

Schaible, S., Bernet, C., Ledergeber, P., Balmer, T. and Brändli, C. (2016) Basic Study on the Evaluation of Thermoplastic Polymers as Hot-Melt Adhesives for Mixed-Substrate Joining. Open Journal of Applied Sciences, 6, 579-592.

* cited by examiner

FUSED DEPOSITION MODELING-BASED ADDITIVE MANUFACTURING PROCESS AT LOW TEMPERATURES

CROSS-REFERENCE TO RELATED APPLICATIONS

This application is a national stage application (under 35 U.S.C. § 371) of PCT/EP2017/072731, filed Sep. 11, 2017, which claims benefit of European Application No. 16188416.8, filed Sep. 12, 2016, both of which are incorporated herein by reference in their entirety.

The present invention relates to a method of producing an article, comprising the steps of: I) applying a filament of an at least partly molten construction material to a carrier, such that a layer of the construction material is obtained, corresponding to a first selected cross section of the article; II) applying a filament of the at least partly molten construction material to a previously applied layer of the construction material, such that a further layer of the construction material is obtained, which corresponds to a further selected cross section of the article and which is bonded to the layer applied beforehand; III) repeating step II) until the article is formed; where at least steps II) and III) are conducted within a chamber and the construction material includes a fusible polymer. The invention likewise relates to an article produced by the method of the invention, to an article comprising a substrate and an article bonded to the substrate, where the article takes the form of an adhesive join or varnish region.

Additive manufacturing methods refer to those methods by which articles are built up layer by layer. They therefore differ distinctly from other methods of manufacturing articles such as machining, drilling or material removal. In the latter methods, an article is processed such that it takes on its final geometry via removal of material.

Additive manufacturing methods use different materials and processing techniques to build up articles layer by layer. In Fused Deposition Modeling (FDM) methods, for example, a thermoplastic wire is liquefied and deposited onto a movable construction platform layer by layer with the aid of a nozzle. Solidification gives rise to a solid article. The nozzle and construction platform are controlled on the basis of a CAD drawing of the article. An early patent document for this technology is U.S. Pat. No. 5,121,329. If the geometry of this article is complex, for example with geometric undercuts, support materials additionally have to be printed and removed again after completion of the article.

On the basis of the polymers that are nowadays used predominantly in polymer-based additive manufacturing methods, articles are formed that have mechanical properties that can differ fundamentally from the characteristics of the materials as known in other plastics processing methods, such as injection molding. When processed by the additive manufacturing methods, the thermoplastic materials used lose their specific characteristics.

Nylon-12 (PA12) is currently one of the most widely used materials for additive manufacturing methods. PA12 is notable for high strength and toughness when it is processed by injection molding or by extrusion. During the melting operation and especially in the course of cooling, an irregular inner structure of the so-called semicrystalline polymers arises (for example PA12 and also PP). The inner structure (morphology) of semicrystalline polymers is partly characterized by a high level of order. A certain proportion of the polymer chains forms crystalline, tightly packed structures in the course of cooling. During the melting and cooling, these crystallites grow in an irregular manner. The irregularity of the morphology thus formed promotes the formation of cracks under mechanical stress. The residual porosity which is unavoidable in the powder-based additive method promotes the growth of cracks. Brittle properties of the components thus formed are the result. For elucidation of this effect, reference is made to European Polymer Journal 48 (2012), pages 1611-1621.

WO 2015/197515 A1 describes a thermoplastic pulverulent composition comprising 0.02% to 0.5% by weight, based on the total amount of composition, of plasticizer and pulverulent thermoplastic polyurethane, where at least 90% by weight of the composition has a particle diameter of less than 0.25 mm, where the thermoplastic polyurethane is obtainable from the reaction of components a) at least one organic diisocyanate, b) at least one compound having groups reactive toward isocyanate groups and having a number-average molecular weight ($M_n$) of 500 g/mol to 6000 g/mol and a number-average functionality of the totality of the components under b) of 1.8 to 2.5, c) at least one chain extender having a molecular weight ($M_n$) of 60-450 g/mol and a number-average functionality of the totality of the chain extenders under c) of 1.8 to 2.5, in the presence of d) optionally catalysts, e) optionally auxiliaries and/or additives, f) optionally one or more chain terminators.

The thermoplastic polyurethane according to WO 2015/197515 A1 has a melting range (DSC, differential scanning calorimetry; second heating operation at heating rate 5 K/min) of 20 to 170° C. and a Shore A hardness to DIN ISO 7619-1 of 50 to 95, has a melt volume rate (MVR) at a temperature T to ISO 1133 of 5 to 15 $cm^3$/10 min and a change in MVR in the case of an increase in this temperature T by 20° C. of less than 90 $cm^3$/10 min. The end use is the production of articles in powder-based additive manufacturing methods.

WO 2015/109141 A1 discloses systems and processes for the freeform it fabrication of solids, especially Fused Deposition Modeling methods, and various articles obtained by the methods. The systems and methods use particular thermoplastic polyurethanes derived from (a) a polyisocyanate component, (b) a polyol component and (c) an optional chain extender component, where the thermoplastic polyurethane polymer obtained has a crystallization temperature above 80° C. and retains more than 20% of its storage modulus at 100° C. relative to the storage modulus at 20° C.

WO 98/53974 A1 relates to the rapid prototyping of solid models from thermoplastic materials and especially to a method for the rapid prototyping of models, wherein curl and other modes of distortion are reduced. What is claimed is a method for making a three-dimensional physical object of a predetermined shape under control of a control system, said method employing a thermally solidifiable material having a solidification temperature and a creep relaxation temperature, said method comprising the steps of: a. dispensing said thermally solidifiable material in a fluid state from an extruder into a build region having at least a local region temperature that exceeds the solidification temperature of the thermally solidifiable material; b. simultaneously with the dispensing of the said thermally solidifiable material, and in response to said control system, generating relative movement between the extruder and a support in the build region, so that the said thermally solidifiable material accumulates on said support to form a three-dimensional physical object; and c. solidifying said thermally solidifiable material by cooling said local region temperature and said material below the solidification temperature of the material.

In practice, the heating of the chamber in Fused Deposition Modeling methods is associated with an unwanted temperature gradient from inner regions of the chamber to outer regions of the chamber and hence also with an unwanted temperature gradient within the component. Particularly in the case of semicrystalline thermoplastic polymers, owing to different recrystallization kinetics, this circumstance can lead to variations in material properties within the finished component.

In the prior art, there still exists a need for additive manufacturing methods in which polymers having a low melting range can be used and in which the components obtained have homogeneous material properties. It is an object of the present invention to at least partially eliminate the disadvantages in the prior art. A particular object addressed was that of specifying such a Fused Deposition Modeling method.

What is proposed in accordance with the invention is a method of producing an article, comprising the steps of:
I) applying a filament of an at least partly molten construction material to a carrier, such that a layer of the construction material is obtained, corresponding to a first selected cross section of the article;
II) applying a filament of the at least partly molten construction material to a previously applied layer of the construction material, such that a further layer of the construction material is obtained, which corresponds to a further selected cross section of the article and which is bonded to the layer applied beforehand;
III) repeating step II) until the article is formed;
where at least steps II) and III) are conducted within a chamber and the construction material includes a fusible polymer.

The fusible polymer has a melting range (DSC, differential scanning calorimetry, 2nd heating operation at heating rate 5 K/min.) of ≥20° C. to ≤100° C. In addition, the fusible polymer has a magnitude of the complex viscosity $|\eta^*|$ (determined by viscometry measurement in the melt with a plate/plate oscillation shear viscometer at 100° C. and a shear rate of 1/s) of ≥10 Pas to ≤1 000 000 Pas.

Finally, the temperature within the chamber is ≤50° C. Preferably, the temperature within the chamber is especially understood to mean the temperature of the material present within the chamber. Further preferably, the temperature within the chamber is identical to the temperature of the material present therein.

In the method of the invention, an article is built up layer by layer. In this respect, the method is a Fused Deposition Modeling (FDM) method. If the number of repetitions for the applying is sufficiently low, it is also possible to make reference to a two-dimensional article which is to be constructed. Such a two-dimensional article can also be characterized as a coating. For example, for construction thereof, ≥2 to ≤20 repetitions for the application can be conducted.

An electronic model of the article to be formed appropriately exists in a CAD program. The CAD program can then calculate cross sections of the model that become cross sections of the article by application of the filament.

The individual filaments that are applied may have a diameter of ≥50 μm to ≤200 μm. Further preferably, the filaments may also have a diameter of ≥50 μm to ≤2000 μm.

Step I) of the method relates to the construction of the first layer on a carrier. Subsequently, step II), in which further layers are applied to previously applied layers of the construction material, is executed until the desired end result in the form of the article is obtained. The at least partly molten construction material bonds to existing layers of the material in order to form a structure in z direction.

The temperature at which the at least partly molten construction material is applied is preferably at least 10° C. above the melting temperature and preferably <100° C. above the upper temperature in the melting range of the fusible polymer.

The temperature at which the at least partly molten construction material is applied is preferably at least 10° C. above the melting temperature and preferably <200° C. above the upper temperature in the melting range of the fusible polymer.

As well as the fusible polymer, the construction material may also comprise further additives such as fillers, stabilizers and the like, but also further polymers. The total content of additives in the construction material may, preferably is in the range of ≥0.1% by weight to ≤10% by weight, preferably ≥1% by weight to ≤5% by weight.

The fusible polymer has a melting range of ≥20° C. to ≤100° C., preferably of ≥25° C. to ≤90° C. and more preferably of ≥30° C. to ≤80° C. In the DSC analysis for determination of the melting range, the material is subjected to the following temperature cycle: 1 minute at −60° C., then heating to 200° C. at 5 kelvin/minute, then cooling to −60° C. at 5 kelvin/minute, then 1 minute at −60° C., then heating to 200° C. at 5 kelvin/minute. The construction material itself may likewise have a melting range from ≥20° C. to ≤100° C., preferably from ≥25° C. to ≤90° C. and more preferably from ≥30° C. to ≤80° C., according to the aforementioned method.

It is possible that the temperature interval between the start of the melting operation and the end of the melting operation as determinable by the above DSC protocol is ≤20° C., preferably ≤10° C. and more preferably ≤5° C. The temperature on commencement of the melting operation is also referred to as $T_{onset}$, and the temperature at the end of the melting operation as $T_{offset}$.

The manner of application of the filament in step I) of the method of the invention is also called "extruding", and the device for application in step I) is also called "extruder" hereinafter. The temperature at which the material is applied or extruded is referred to as extrusion temperature.

Preferably, the melting temperature $T_m$ of the fusible polymer or the glass transition temperature $T_g$ of the amorphous polymer used in the form of a filament, pellets or another suitable "feed" material for the extruder used in the method of the invention for production of an article is within a range from 10 to 99° C., or preferably from 20 to 80° C., or preferably from 30 to 60° C., above the temperature within the construction space during the method of the invention. Preferably, the extrusion temperature of the material in the method of the invention is >10° C., preferably >30° C., or preferably >50° C., or preferably >100° C., or preferably >150° C., higher than the melting temperature $T_m$ or glass transition temperature $T_g$ in the case of an amorphous material of the material of the invention, if reference is made to a melting point I'm, the upper temperature ($T_{offset}$) of the melting range is appropriately assumed here to be the melting point. Preferably, the material of the invention is extruded in the method of the invention at an extrusion rate of >1 mm/min, preferably >10 mm/min, more preferably >100 mini/min. In a particularly preferred embodiment, the XY movement rate in mm/min of the extrusion head in the method of the invention is at least 2 times, preferably at least 5 times and more preferably at least 10 times as high as the extrusion rate of the filament from the extrusion head. In a preferred embodiment, the line width of the extruded filament deposited is at least 1.5 times, preferably at least 2 times, as broad as the line height of the extruded filament. In a particular embodiment, this preferably gives rise to oval application shapes on the given substrate. A further advantage of this application geometry is the increased surface area that enables better temperature control in the cooled construction space. Preferably, the layer application is conducted with an areal contact pressure of >0.1 bar, preferably >0.2 bar, or preferably >0.5 bar but preferably <20 bar. The contact pressure is found from the combination of substrate modulus, viscosity of the extrudate and the ratio of extrusion die diameter to the distance of the extrusion head from the substrate. Further preferably, the substrate geometry is deformed on application of the extrudate. Preferably, the substrate height after application of the extrudate is <the substrate height prior to application of the extrudate, reduced by the application thickness of the extrudate. Preferably, the substrate is the extrudate from a prior layer. Preferably, the applied extrudate increases the average temperature of the substrate layer beneath, which is preferably of the same thickness, by >5° C., preferably >20° C. or preferably >30° C. but preferably <813° C. Preferably, the modulus G' of the substrate layer, particularly when the substrate is of the same material as the extrudate, decreases by >20%, preferably >40%, or preferably >50% but preferably <95%. The modulus G' of a layer is determined from the temperature of the layer (measured by means of a high-resolution thermal imaging camera) and a temperature/modulus measurement at a shear rate of 0.1/s in a conventional plate/plate rheometer, with commencement of the measurement at 120° C. and cooling at PC/min to 0° C.

Preferably, the time between two layers is <10 min, preferably <5 min, or preferably <2 min, or preferably <1 min, or >30 sec. Preferably, the time between two layers is within a range from 30 sec to 10 min, or preferably from 35 sec to 5 min, or preferably from 40 sec to 2 min.

The fusible polymer also has a magnitude of the complex viscosity |η*| (determined by viscometry measurement in the melt with a plate/plate oscillation viscometer according to ISO 6721-10 at 100° C. and a shear rate of 1/s) of ≥10 Pas to ≤1 000 000 Pas. Preferably, |η*| under these measurement conditions is ≥100 Pas to ≤500 000 Pas, more preferably ≥1000 Pas to ≤200 000 Pas.

The magnitude of the complex viscosity |η*| describes the ratio of the viscoelastic moduli G' (storage modulus) and G" (loss modulus) to the excitation frequency ω in a dynamic-mechanical material analysis:

$$|\eta^*| = \sqrt{\left[\left(\frac{G'}{\omega}\right)^2 + \left(\frac{G''}{\omega}\right)^2\right]} = \frac{|G^*|}{\omega}$$

It is further envisaged in accordance with the invention that the temperature within the chamber is ≤50° C. The temperature is preferably ≥0° C. to ≤50° C., more preferably ≥5° C. to ≤40° C. and especially preferably ≥10° C. to 35° C. Further preferably, the temperature within the chamber is ≥−75° C. to ≤50° C., more preferably ≥−40° C. to ≤40° C. and especially preferably ≥0° C. to ≤35° C. and very especially preferably ≥5° C. to ≤25° C.

The combination of the comparatively low melting range and the complex viscosity of the fusible polymer in conjunction with the comparatively low temperature of the chamber and hence of the fusible polymer has multiple advantages. It is possible to reduce or to suppress component warping as a result of spatially different crystallization processes. By working at a temperature below 100° C., it is possible to avoid formation of blisters in the component through water vapor. It is thus possible for the polymer to contain greater amounts of water than at higher temperatures in the chamber.

Given the complex viscosities within the range specified in accordance with the invention, it can be assumed that, at a chosen chamber temperature of ≤50° C., only a technically insignificant level of tackiness, if any, will occur in the fusible polymer used.

It is likewise possible to reduce the degree of sublimation of organic compounds into the chamber. In that case, it is also possible to process polymers comprising plasticizer and solvent. No specially dried or inert atmosphere in the chamber is required. Explosion protection in the chamber is likewise improved when operation is effected at a temperature below the flashpoint of the substances present in the chamber.

Embodiments and further aspects of the invention are described hereinbelow. They may be combined with one another as desired unless the opposite is clear from the context.

In one embodiment of the method of the invention, the interior of the chamber is cooled at least at times. Suitable cooling methods include the cooling of one or more walls of the chamber or the providing of cold, inert gas within the chamber.

In a further preferred embodiment of the method of the invention, the interior of the chamber is not heated at least at times. In that case, the thermal energy introduced by the FDM printhead and the polymer melt is exploited to maintain the desired temperature in the chamber.

In a further preferred embodiment of the method of the invention, the fusible polymer has a Shore hardness (DIN ISO 7619-1) of ≥40 A to ≤80 D. Preference is given to Shore hardnesses of ≥40 A to ≤70 D, more preferably ≥50 A to ≤50 D.

In a further preferred embodiment of the method of the invention, the fusible polymer is selected from the group consisting of: polyurethane, polyester, polyalkylene oxide, plasticized PVC, polyamide, protein or a combination of at least two of these.

Preferably, the fusible polymer is a polyurethane at least partly obtainable from the reaction of aromatic and/or aliphatic polyisocyanates with suitable (poly)alcohols and/or (poly)amines or blends thereof. Preferably, at least a proportion of the (poly)alcohols used comprises those from the group consisting of linear polyesterpolyols, polyetherpolyols, polycarbonatepolyols, polyacrylatepolyols or a combination of at least two of these. In a preferred embodiment, these (poly)alcohols or (poly)amines bear terminal alcohol and/or amine functionalities. In a further preferred embodiment, the (poly)alcohols and/or (poly)amines have a molecular weight of 52 to 10 000 g/mol. Preferably, these (poly)alcohols or (poly)amines as feedstocks have a melting point in the range from 5 to 150° C. Preferred polyisocyanates that can be used at least in a proportion for preparation of the fusible polyurethanes are selected from the group consisting of TDI, MDI, HDI, PDI, H12MDI, IPDI, TODI, XDI, NDI, decane diisocyanate or a combination of at least two of these. Particularly preferred polyisocyanates are HDI, PDI, H12MDI, MDI and TDI.

In a further preferred embodiment, the fusible polymer is a polyurethane obtainable from the reaction of a polyisocyanate component and a polyol component, said polyol component comprising a polyesterpolyol having a pour point (ASTM D5985) of ≥25° C.

If appropriate, in the reaction to give the polyurethane, it is also possible to use diols from the molecular weight range of ≥62 to ≤600 g/mol as chain extenders.

The polyisocyanate component may comprise a symmetric polyisocyanate and/or a nonsymmetric polyisocyanate. Examples of symmetric polyisocyanates are 4,4'-MDI and HDI.

In the case of nonsymmetric polyisocyanates, the steric environment of one NCO group in the molecule is different from the steric environment of a further NCO group. In that case, one isocyanate group reacts more quickly with groups reactive toward isocyanates, for example OH groups, while the remaining isocyanate group is less reactive. One consequence of the nonsymmetric structure of the polyisocyanate is that the polyurethanes formed with these polyisocyanates also have a less linear structure.

Examples of suitable nonsymmetric polyisocyanates are selected from the group consisting of: 2,2,4-trimethylhexamethylene diisocyanate, ethylethylene diisocyanate, nonsymmetric isomers of dicyclohexylmethane diisocyanate ($H_{12}$-MDI), nonsymmetric isomers of 1,4-diisocyanatocyclohexane, nonsymmetric isomers of 1,3-diisocyanatocyclohexane, nonsymmetric isomers of 1,2-diisocyanatocyclohexane, nonsymmetric isomers of 1,3-diisocyanatocyclopentane, nonsymmetric isomers of 1,2-diisocyanatocyclopentane, nonsymmetric isomers of 1,2-diisocyanatocyclobutane, 1-isocyanatomethyl-3-isocyanato-1,5,5-trimethylcyclohexane (isophorone diisocyanate, IPDI), 1-methyl-2,4-diisocyanatocyclohexane, 1,6-diisocyanato-2,2,4-trimethylhexane, 1,6-di isocyanato-2,4,4-trimethylhexane, 5-isocyanato-1-(3-isocyanatoprop-1-yl)-1,3,3-trimethylcyclohexane, 5-isocyanato-1-(4-isocyanatobut-1-yl)-1,3,3-trimethylcyclohexane, 1-isocyanato-2-(3-isocyanatoprop-1-yl)-cycyclohexane, 1-isocyanato-2-(2-isocyanatoeth-1-yl)cyclohexane, 2-hept-yl-3,4-bis(9-isocyanatononyl)-1-pentylcyclohexane, norbornane diisocyanatomethyl, diphenylmethane 2,4'-diisocyanate (MDI), tolylene 2,4- and 2,6-diisocyanate (TDI), derivatives of the diisocyanates listed, especially dimerized or trimerized types, or a combination of at least two of these.

Preference is given to 4,4'-MDI or a mixture comprising IPDI and HDI as polyisocyanate component.

The polyol component includes a polyester polyol having a no-flow point (ASTM D5985) of ≥25° C., preferably ≥35° C., more preferably ≥35° C. to ≤55° C. To determine the no-flow point, a test vessel containing the sample is set in slow rotation (0.1 rpm). A flexibly mounted measurement head dips into the sample and, on attainment of the no-flow point, moves away from its position as a result of the abrupt increase in viscosity; the resulting tilting motion triggers a sensor.

Without being restricted to a theory, it is assumed that polyurethanes based on the above-discussed nonsymmetric polyisocyanates and polyesterpolyols having the no-flow points specified have such a construction that the groups that originate from the polyisocyanates in the polymer constitute soft segments, and the groups that originate from the polyester polyols in the polymer constitute hard segments.

At the temperatures in the chamber of the processing system that are envisaged in accordance with the invention, it is assumed that the mobility of the polyester chains in the polyurethane is as limited as would be the case in the free polyesterpolyol below its no-flow point. Correspondingly, the polyurethane polymer has only a technically insignificant level of tackiness, if any, under the processing conditions (preferably after a time of ≥1 minute to ≤2 hours).

Examples of polyesterpolyols which can have such a no-flow point are reaction products of phthalic acid, phthalic anhydride or symmetric α, ω-$C_4$- to $C_{10}$-dicarboxylic acids with one or more $C_2$- to $C_{10}$-diols. They preferably have a number-average molecular weight $M_n$ of ≥400 g/mol to ≤6000 g/mol. Suitable diols are especially monoethylene glycol, butane-1,4-diol, hexane-1,6-diol and neopentyl glycol.

Preferred polyesterpolyols are specified hereinafter, stating their acid and diol components: adipic acid+monoethylene glycol; adipic acid+monoethylene glycol+butane-1,4-diol; adipic acid+butane-1,4-diol; adipic acid+hexane-1,6-diol+neopentyl glycol; adipic acid+hexane-1,6-diol; adipic acid+butane-1,4-diol 4-hexane-1,6-diol; phthalic acid/anhydride+monoethylene glycol+-trimethylolpropane; phthalic acid/anhydride+monoethylene glycol. Preferred polyurethanes are obtained from a mixture comprising IPDI and MI as polyisocyanate component and a polyol component comprising an aforementioned preferred polyesterpolyol. Particular preference is given to the combination of a mixture comprising IPDI and HDI as polyisocyanate component with a polyesterpolyol formed from adipic acid+-butane-1,4-diol+hexane-1,6-diol for formation of the polyurethanes.

It is further preferable that the polyesterpolyols have an OH number (DIN 53240) of ≥25 to ≤170 mg KOH/g and/or a viscosity (75° C., DIN 51550) of ≥50 to ≤5000 meas.

One example is a polyurethane obtainable from the reaction of a polyisocyanate component and a polyol component, where the polyisocyanate component comprises an HDI and IPDI and where the polyol component comprises a polyesterpolyol which is obtainable from the reaction of a reaction mixture comprising adipic acid and also hexane-1,6-diol and butane-1,4-diol with a molar ratio of these diols of ≥1:4 to ≤4:1 and which has a number-average molecular weight $M_n$ (GPC, against polystyrene standards) of ≥4000 g/mol to ≤6000 g/mol. Such a polyurethane may have a magnitude of the complex viscosity |n*| (determined by viscometry measurement in the melt with a plate/plate oscillation viscometer according to ISO 6721-10 at 100° C. and a shear rate of l/s) of ≥4000 Pas to ≤160 000 Pas.

A further example of a suitable polyurethane is:
1. Substantially linear polyester polyurethanes having terminal hydroxyl groups as described in EP 0192946 A1, prepared by reaction of
a) polyester diols of molecular weight above 600 and optionally
b) diols from the molecular weight range from 62 to 600 g/mol as chain extenders with
c) aliphatic diisocyanates,
observing an equivalents ratio of hydroxyl groups of components a) and b) to isocyanate groups of component c) of 1:0.9 to 1:0.999, where component a) consists to an extent of at least 80% by weight of polyester diols from the molecular weight range of 4000 to 6000 based on (i) adipic acid and (ii) mixtures of 1,4-dihydroxybutane and 1,6-dihydroxyhexane in a molar ratio of the diols of 4:1 to 1:4.

In the polyester polyurethanes mentioned under 1., it is preferable that component a) consists to an extent of 100% of a polyester diol of the molecular weight range from 4000 to 6000, the preparation of which involved using, as diol mixture, a mixture of 1,4-dihydroxybutane and 1,6-dihydroxyhexane in a molar ratio of 7:3 to 1:2.

In the polyester polyurethanes mentioned under 1., it is also preferable that component c) comprises 1PDI and also HDI.

In the polyester polyurethanes mentioned under 1., it is also preferable that the preparation thereof involved also using, as component h), alkanediols selected from the group consisting on 1,2-dihydroxyethane, 1,3-dihydroxypropane, 1,4-dihydroxybutane, 1,5-dihydroxypentane, 1,6-dihydroxyhexane or a combination of at least two of these, in an amount of up to 200 hydroxyl equivalent percent, based on component a).

In a further preferred embodiment of the method of the invention, the fusible polymer, after heating to 100° C. and cooling to 20° C. at a cooling rate of 4° C./min, within a temperature interval from 25° C. to 40° C. for ≥1 minute (preferably 1 minute to ≤100 minutes, more preferably =10 minutes to ≤60 minutes), has a storage modulus G' (determined at the respective temperature with a plate/plate oscillation viscometer according to ISO 6721-10 at a shear rate of l/s) of ≥100 kPa to ≤1 MPa and, after cooling to 20° C. and storage at 20° C. for 120 minutes, has a storage modulus G' (determined at 20° C. with a plate/plate oscillation viscometer according to ISO 6721-10 at a shear rate of l/s) of ≥10 MPa (preferably ≥100 MPa).

In a further preferred embodiment of the method of the invention, the article formed is subjected to an aftertreatment selected from the group consisting of: mechanical smoothing of the surface, controlled local heating, heating of the entire article, controlled local cooling, cooling of the entire article, contacting of the article with steam, contacting of the article with the vapor of an organic solvent, irradiating the article with electromagnetic radiation, immersing the article into a liquid bath, or a combination of at least two of these. After treatments of this kind serve particularly to improve the surface quality of the article.

In a further preferred embodiment of the method of the invention, the article is formed on a substrate and, on conclusion of the method, remains bonded to the substrate. Thus, the target surface in the first step of the first operation in the method of the invention is the substrate. The substrate is preferably a component intended for bonding to other components. It is further preferable that a polyurethane polymer is used as material for the article. Owing to its properties, the polymer may be utilizable as adhesive and/or as varnish. By the method of the invention, it is thus possible to apply an adhesive layer, an adhesive join, a varnish layer or a coating selectively to a workpiece. The adhesive layer or adhesive join that has been applied by a method of the invention may also differ chemically and visually from sintered adhesive layers. Adhesive layers obtained by application sintering have a lower density and generally a matter surface. The varnish layer or coating that has been applied by a method of the invention may also differ chemically and visually from baked powder coating layers. Varnish layers obtained by application sintering are applied more accurately in terms of position and generally have a matter surface.

The invention further relates to an article that has been produced by a method of the invention. In a preferred embodiment, the article takes the form of a shaped adhesive body. The shape of the shaped adhesive body can be chosen with an exact fit for components to be bonded. Such a shaped body may be nontacky at room temperature and may be produced to be held in stock. It can be positioned at its intended site by appropriate manipulation tools and be activated by heat, and in this way can bond components to be bonded to one another.

The invention further provides an article produced by a method of the invention, having the features that the article is formed on a substrate and, on conclusion of the method, remains bonded to the substrate, having a substrate and an article bonded to the substrate, wherein the article takes the form of an adhesive join or of a varnish region.

The materials of the invention and filaments having a diameter of 3 mm that were used in the experiments which follow were produced by extrusion of the starting materials that were in the form of granules, pellets, powder, precomminuted coarse material or the like with a maximum diameter of 4 to 6 mm, at extrusion temperatures below 240° C.

The inventive Desmomelt® filament of diameter 2 mm was obtained by extrusion of Desmomelt® 530 granules, commercially available from Covestro Deutschland AG.

The inventive Dispercoll®-U filament based on commercially available Dispercoll U 56 from Covestro Deutschland AG was precipitated out of a stable aqueous dispersion by freezing at −20° C., filtered and, prior to the extrusion, dried in a Binder FDL115 drying cabinet at 30° C. for 48 hours. For this purpose, the powder was spread out on a metal sheet. The inventive Dispercoll® filament of diameter 2 mm used was obtained by extrusion of the above-described dried Dispercoll® U 56 powder.

Both filaments of the invention were dried prior to use in a vacuum drying cabinet at 30° C. for 24 h.

The ABS comparative material was sourced from German RepRap and used as supplied.

For the experiment, a Dispercoll® U56 and a Desmomelt® 530 were used. For the experiment, individual sheets in a square shape were laid one on top of another at different ambient temperatures. The temperatures were generated here with a HG 2320 E hot air gun (Steinel) and with the aid of dry ice in the construction chamber. The ambient temperature was measured directly alongside the printed object with a testo 735 temperature measurement device (Testo) with a type K (pt100) sensor. In order to assure a stable temperature, the attainment of the target temperature was hallowed by a delay of at least 10 minutes. The FDM printer used was an X400 (German RepRap) equipped with a titanium extruder (E3D) and a v6 full-metal hot end (E3D). The edge lengths of the printed object were 50 mm. The corners had a radius of 10 mm. Every 40 cycles at elevation, the movement speed was increased by 5 mm/s. The printing was continued until distinctly visible printing errors occurred, or the object collapsed due to heat. The nozzle temperature was 240° C. The nozzle had a diameter of 0.4 mm and the layer thickness was 0.2 mm. The first speed was 30 mm/s and was then increased by 5 mm/s every 40 cycles. After the printing was stopped, the samples from the various ambient temperatures were compared and the printing speed or number of cycles at which errors occurred was noted. In all samples, it was a feature of the errors that the object collapsed in places or completely as a result of excessively high heat input and hence the desired geometry was lost.

Table I shows the results of the experiments on material suitable in accordance with the invention—labeled (*) by the method of the invention labeled (*).

TABLE 1

Comparison of the test bodies of materials suitable in accordance with the invention (labeled *) and noninventive materials by the method of the invention (labeled *).

| Construction space temperature [° C.] | | ABS German RepRap | Desmomelt ® 530 (*) | Dispercoll ® U 56 (*) |
|---|---|---|---|---|
| 60° C. | Number of layers/ | >100 | <30 | <10 |
|  | layer adhesion | brittle | good | good |
| 49° C. (*) | Number of layers/ | >100 | <50 | <20 |
|  | layer adhesion | brittle | good | good |
| 25° C. (*) | Number of layers/ | >100 | <70 | <30 |
|  | layer adhesion | very brittle | good | good |
| 10° C. (*) | Number of layers/ | >100 | <120 | <70 |
|  | layer adhesion | very brittle | good | good |

It was shown that, at a material temperature of >50° C., it was possible only to a limited degree to produce usable dimensionally stable products from the materials suitable in accordance with the invention. By lowering the construction space temperature to <50° C., distinctly better results were achieved, and it was noticeable that there was a distinct increase in the number of material layers before distinct geometric deformation of the test specimen with falling construction space temperature. By contrast, noninventive materials in the method of the invention sometimes show a comparatively high number of possible layers without major geometric deformation, but the layers, particularly at lower temperatures, only have very low adhesion and are bonded in an exceptionally brittle manner.

The invention claimed is:

1. A method of producing an article, comprising the steps of:
   I) applying a filament of an at least partly molten construction material to a carrier, such that a layer of the construction material is obtained, corresponding to a first selected cross section of the article;
   II) applying a filament of the at least partly molten construction material to a previously applied layer of the construction material, such that a further layer of the construction material is obtained, which corresponds to a further selected cross section of the article and which is bonded to the layer applied beforehand;
   III) repeating step II) until the article is formed;
   where at least steps II) and III) are conducted within a chamber and the construction material includes a fusible polymer;
   wherein
   the upper melting temperature of the fusible polymer is within a melting range (DSC, differential scanning calorimetry, 2nd heating operation at heating rate 5 K/min.) of >20° C. to <100° C.,
   the fusible polymer has a magnitude of the complex viscosity |n*| (determined by viscometry measurement in the melt with a plate/plate oscillation shear viscometer at 100° C. and a shear rate of 1/s) of >1000 Pas to <1 000 000 Pas, wherein the fusible polymer is a polyurethane obtainable from the reaction of a polyisocyanate component and a polyol component, said polyol component comprising a polyesterpolyol having a pour point (ASTM D5985) of >25° C.,
   and wherein the temperature within the chamber is <50° C.

2. The method as claimed in claim 1, wherein the interior of the chamber is cooled at least at times.

3. The method as claimed in claim 1, wherein the interior of the chamber is not heated at least at times.

4. The method as claimed in claim 1, wherein the fusible polymer has a Shore hardness (DIN ISO 7619-1) of >40 Shore A to <80 Shore D.

5. The method as claimed in claim 1, wherein the fusible polymer, after heating to 100° C. and cooling to 20° C. at a cooling rate of 4° C./min, within a temperature interval from 25° C. to 40° C. for >1 minute, has a storage modulus G' (determined at the respective temperature with a plate/plate oscillation viscometer according to ISO 6721-10 at a shear rate of 1/s) of >100 kPa to <1 MPa and, after cooling to 20° C. and storage at 20° C. for 120 minutes, has a storage modulus G' (determined at 20° C. with a plate/plate oscillation viscometer according to ISO 6721-10 at a shear rate of 1/s) of >10 MPa.

6. The method as claimed in claim 1, wherein the article formed is subjected to an aftertreatment selected from the group consisting of mechanical smoothing of the surface, controlled local heating, heating of the entire article, controlled local cooling, cooling of the entire article, contacting of the article with steam, contacting of the article with the vapor of an organic solvent, irradiating the article with electromagnetic radiation, immersing the article into a liquid bath, and a combination of at least two of these.

7. The method as claimed in claim 1, wherein the article is formed on a substrate and, on conclusion of the method, remains bonded to the substrate.

8. The method as claimed in claim 1, wherein the polyesterpolyol has a number average molecular weight of from 400 g/mol to 6000 g/mol.

* * * * *